United States Patent [19]

Elliott

[11] Patent Number: 5,420,988
[45] Date of Patent: May 30, 1995

[54] ESTABLISHING LOGICAL PATHS THROUGH A SWITCH BETWEEN CHANNELS AND CONTROL UNITS IN A COMPUTER I/O SYSTEM

[75] Inventor: Joseph C. Elliott, Hopewell Junction, N.Y.

[73] Assignee: International Business Machines Corporation, Armonk, N.Y.

[21] Appl. No.: 208,066

[22] Filed: Mar. 8, 1994

Related U.S. Application Data

[63] Continuation of Ser. No. 576,561, Aug. 31, 1990, abandoned.

[51] Int. Cl.$^6$ .............................................. G06F 13/14
[52] U.S. Cl. ................... 395/275; 395/325; 395/725; 364/DIG. 1; 364/400; 364/405; 364/407; 364/419.01
[58] Field of Search ..................... 395/275, 325, 725

[56] References Cited

U.S. PATENT DOCUMENTS

| | | | |
|---|---|---|---|
| 3,400,371 | 9/1968 | Amdahl et al. | 395/275 |
| 3,725,864 | 4/1973 | Clark et al. | 395/275 |
| 4,060,849 | 11/1977 | Bienvenu et al. | 395/275 |
| 4,207,609 | 6/1980 | Luiz et al. | 395/325 |
| 4,396,984 | 8/1983 | Videki, II | 395/275 |
| 4,455,605 | 6/1984 | Cormier et al. | 395/275 |
| 4,697,232 | 9/1987 | Brunelle et al. | 395/275 |
| 4,760,553 | 7/1980 | Buckley et al. | 395/575 |
| 4,922,410 | 5/1990 | Morikawa et al. | 395/275 |
| 5,170,472 | 12/1992 | Cwiakala et al. | 395/275 |

FOREIGN PATENT DOCUMENTS 2128005 10/1972 France ..................... G06F 13/12

OTHER PUBLICATIONS

Patent Abstract of Japan, vol. 7, No. 220 (P-226) (1365) Sep. 30, 1983, JP-A-58 112 122 (Fujitsu) Jul. 4, 1983.
IEEE International Conf. on Acoustics, Speech & Signal Processing, vol. 1, Apr. 14, 1983, Boston, Mass., pp. 431–434, Knudsen, "MUSEC, a Powerful Network of Microprocessors".

Primary Examiner—Paul V. Kulik
Attorney, Agent, or Firm—Floyd A. Gonzalez; James E. Murray

[57] ABSTRACT

A mechanism for establishing a logical relationship between a channel and a control unit, called a logical channel path, in a computer input/output system wherein a dynamic switch is provided between the channel and the control unit. The disclosed logical path mechanism provides for the sharing of the same physical path by one or more channels to one or more control units. The initialization procedure disclosed identifies each sharing channel to each control unit configured to that channel for identifying the physical path to that channel in an input/output system wherein a switch between the channels and the control units provides a multipoint topology.

20 Claims, 5 Drawing Sheets

ESTABLISHING LOGICAL PATHS THROUGH A SWITCH BETWEEN CHANNELS AND CONTROL UNITS IN A COMPUTER I/O SYSTEM

CROSS REFERENCE TO RELATED APPLICATION

This application is a continuation of Application Ser. No. 07/576,561 filed on Aug. 31, 1990 and now abandoned.

BACKGROUND OF THE INVENTION

The present invention is related to the establishment of paths from a channel to a control unit in a computer input/output (I/O) system, and is more particularly related to the establishment of logical channel paths between channels and control units wherein a switch is located between one or more of the channels and one or more of the control units.

In computer I/O systems, it has long been the practice to identify the communication paths between a channel and an I/O control unit. U.S. Pat. No. 3,400,371 issued Sep. 3, 1968 to Amdahl et al for "Data Processing System", at column 100, lines 30-33, discloses assigning a distinct address for each path of communications for input/output devices that are accessible through more than one channel.

U.S. Pat. No. 4,760,553 issued Jul. 26, 1980 to Buckley et al for "Terminal System Configuration Tracing Method and Apparatus" discloses a terminal controller system wherein several feature cards are plugged into slots on a board, and I/O signal cards are connected between cards and/or remote multiplexors or terminals. A processor performs a test which enables the processor to logically establish the physical link to particular cards connected to its ports.

U.S. Pat. No. 4,922,410 issued May 1, 1990 to Morikawa et al for "Input/Output System Capable of Allotting Addresses to a Plurality of Input/Output Devices" discloses an input/output process device for controlling data transfers between a central processing unit and an input/output device through a channel by use of a plurality of input/output control devices connected to the input/output device. A memory unit stores information representing the address of the input/output control device in association with an identification number of the channels connected to the input/output control device.

SUMMARY OF THE INVENTION

In the prior art configurations, control units and input/output devices may be accessed through more than one channel over separate communication paths. The present invention provides for the sharing of the same physical path by one or more channels to one or more control units. An initialization procedure identifies each sharing channel to each control unit configured to that channel for the purpose of establishing its identity of the channel path and in so doing identifying the physical path back to that channel in an I/O system wherein a switch between the channels and the control units provides a multipoint topology. Therefore, it is an object of the present invention to provide a logical path mechanism in a computer I/O system having a channel, a dynamic switch and a plurality of control units, wherein the logical channel path mechanism establishes logical channel paths, also referred to herein as logical paths, between the channel and one or more control units.

It is a further object of the invention to provide a storage table in each control unit of an I/O system for storing the identification of all logical paths established between the control unit and channels that may be connected to the control unit via a dynamic switch.

It is another object of the invention to provide a storage table in each channel of an I/O system for storing the identification of all logical paths established between the channel and control units that may be connected to the channel via a dynamic switch.

It is a further object of the present invention to provide an initialization procedure for establishing a logical path from a channel to a control unit via a dynamic switch.

It is a further object of the present invention to provide an allegiance table wherein allegiances that are created as a result of I/O operations can be associated to the logical channel path over which they were generated.

It is another object of the present invention to perform a system reset whenever a logical path is established to or removed from a channel and is performing the system reset, only those allegiances associated with the affected logical path are reset.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
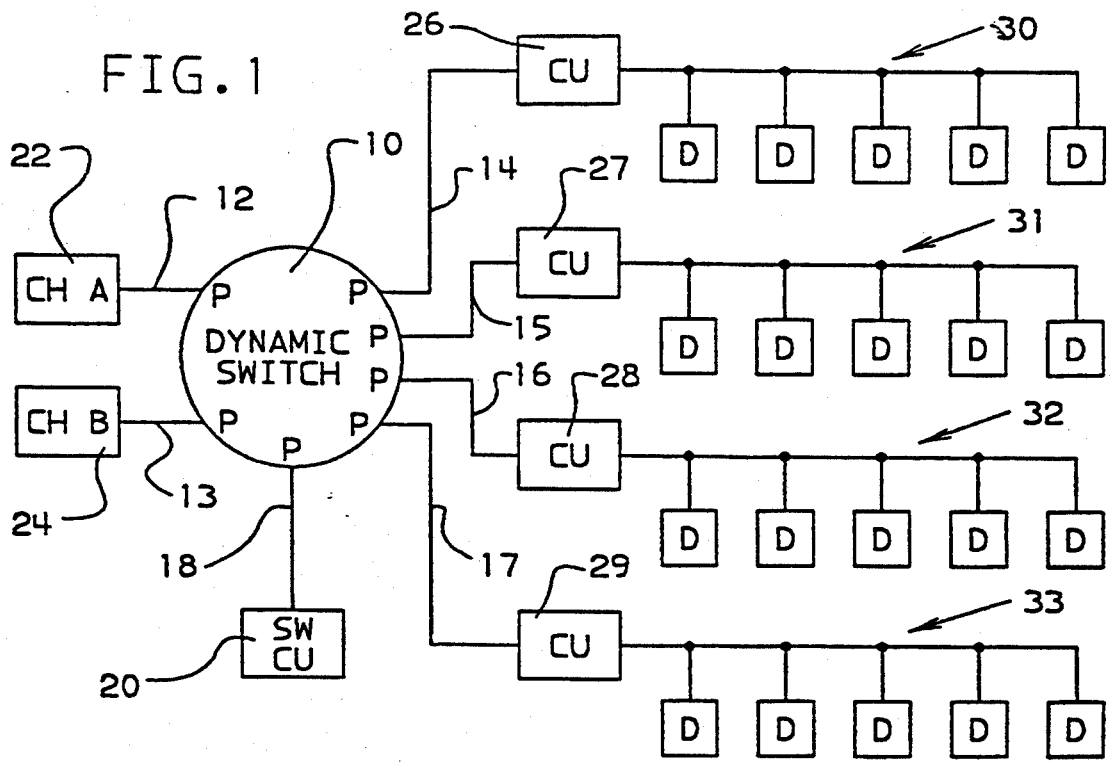
FIG. 1 is a block diagram of an I/O system useable with the present invention, the I/O system having channels connected to control units through a dynamic switch.

FIG. 1 is a block diagram of the I/O system of a data processing system for making dynamic connections between the channel subsystem of the data processing system and control units. The I/O system includes a dynamic switch 10 having a plurality of ports P, each port P attached to one end of a plurality of links 12-18. One of the links 18 is attached to a dynamic-switch control unit 20, and each of the other links 12-17 is attached to either a channel, such as channel A designated 22 or channel B designated 24, or to one of the control units 26-29. Each of the control units 26-29 control a plurality 30–33 of peripheral devices D, respectively.

Each of the channels 22 and 24 is a single interface on a channel subsystem, such as, for instance, an ESA/370 channel subsystem. The channels 22 and 24 direct the transfer of information between I/O devices of the pluralities 30–33 of devices D and main storage (not shown) of the data processing system and provide the common controls for the attachment of different I/O devices D by means of a channel path (to be defined). The channels 22 and 24 are channels wherein data is transmitted and received in a frame, as will be explained.

Each of the links 12–17 is a point-to-point pair of conductors that may physically interconnect a control unit and a channel, a channel and a dynamic switch (such as links 12 and 13), a control unit and a dynamic switch (such as links 14–17), or, in some cases, a dynamic switch and another dynamic switch. The two conductors of a link provide a simultaneous two-way communication path, one conductor for transmitting information and the other conductor for receiving information. When a link attaches to a channel or a control unit, it is said to be attached to the I/O interface of that channel or control unit. When a link is attached to a dynamic switch, it is said to be attached to a port P on that dynamic switch. When the dynamic switch makes a connection between two dynamic-switch ports, the link attached to one port is considered physically connected to the link attached to the other port, and the equivalent of one continuous link is produced for the duration of the connection.

The dynamic switch 10 provides the capability to physically interconnect any two links that are attached to it. The link attachment point on the dynamic switch 10 is the dynamic-switch port P. Only two dynamic-switch ports P may be interconnected in a single connection, but multiple physical connections may exist simultaneously within the same dynamic switch. The dynamic switch 10 may be constructed as disclosed in U.S. Pat. Nos. 4,605,928; 4,630,045; and 4,635,250. In one preferred embodiment, the dynamic switch 10 is a double sided switch, that is a two-sided cross-point switch, as described in the background of the aforementioned U.S. Pat. No. 4,635,250. The interconnection of two dynamic-switch ports P established by the dynamic switch 10 does not affect the existing interconnection of any other pair of dynamic-switch ports, nor does it affect the ability of the dynamic switch to remove those connections.

When a connection is established, two dynamic-switch ports and their respective point-to-point links are interconnected by a switch matrix within the dynamic switch 10, as explained in the aforementioned switch patents, such that the two links are treated and appear as one continuous link for the duration of the connection. When frames are received by one of two connected switch ports P, the frames are normally passed from one port to the other for transmission on the other port's link.

The dynamic switch 10 can form a connection between two ports P in one of two ways: dynamic or static. The connection is termed a dynamic connection or static connection, accordingly.

The dynamic switch 10 can establish or remove a dynamic connection between two ports P based on the information provided by certain frame delimiters in the serial frames transmitted over the links and based on conditions present at each of these ports P as disclosed in U.S. Pat. No. 5,107,489 issued Apr. 21, 1992, now issued U.S. Pat. No. 5,107,489, entitled "Switch and Its Protocol for Making Dynamic Connections" owned by the assignee of the present invention.

The dynamic switch can establish or remove a static connection between two ports P as a result of commands received by means of the local or remote facilities of the dynamic-switch control unit 20. Frame delimiters or other sequences received at the port P have no effect on the static connection.

When a static connection exists between two ports P, the ports are in the static state. The static state is not affected by any information received from the link or from the statically connected port. If a sequence (to be explained) is received by one of two statically connected ports, the received sequence is normally retransmitted on the connected port's link. Frames may be received and transmitted simultaneously by statically connected ports.

Figure 2:
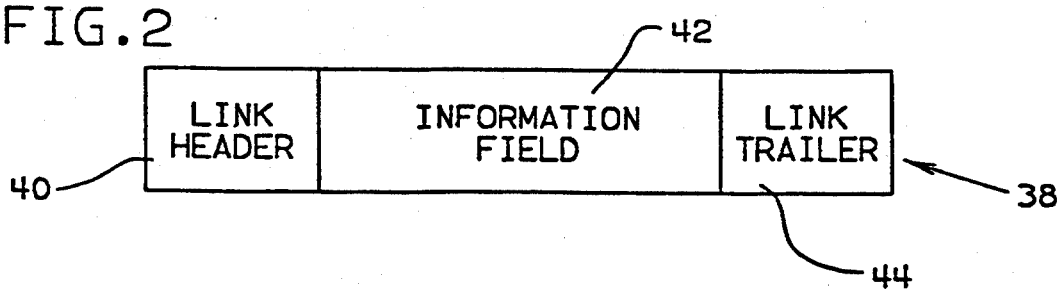
FIG. 2 is a diagrammatic representation of a frame sent over the I/O system of FIG. 1.

As previously mentioned, information is transferred on the serial-I/O interface in a frame. A frame is a unit of information that is sent or received according to a prescribed format. This format delineates the start and end of the unit of information and prescribes the placement of the information within these boundaries. FIG. 2 shows the basic frame format 38 which consists of a fixed-length link-header field 40, a variable-length information field 42, and a fixed-length link-trailer field 44.

Communications using the switch are governed by link-level protocols which provide for making the connection through the dynamic switch 10 and for other control functions. Each channel and each control unit contains a link-level facility, which is the embodiment of the link protocols. After a connection is made through the dynamic switch 10, device frames may be exchanged to execute I/O operations and control the I/O devices. These I/O operations and controls are described in, for example, the device commands and protocols in the Principles of Operation manual of the IBM System/370 Extended Architecture, publication number SA22-7085-1.

Each link-level facility is assigned a unique address, called the link address. The assignment of a link address to a link-level facility occurs when the link-level facility performs initialization, as disclosed in a U.S. patent application Ser. No. 7/576,557 filed Aug. 31, 1990 and titled "Acquiring Addresses in an Input/Output System", owned by the assignee of the present invention. Every frame sent through the switch contains link-level addressing which identifies the source and destination of the frame. Specifically, this addressing information consists of the link addresses of the sending link-level facility (source link address) and receiving link-level facility (destination link address). The switch uses this addressing information in order to make a connection from the port receiving the frame to the correct port for sending the frame to the specified destination.

Figure 3:
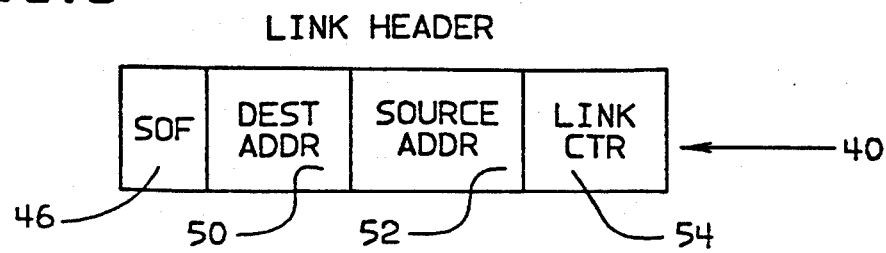
FIG. 3 is a diagrammatic representation of a link header of the frame of FIG. 2.
Figure 4:
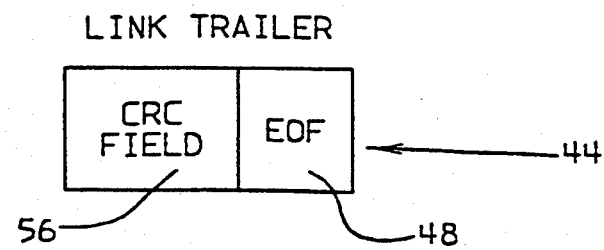
FIG. 4 is a diagrammatic representation of a link trailer of the frame of FIG. 2.

FIG. 3 shows a link header 40, and FIG. 4 shows a link trailer 44. Every frame is bounded by a start-of-frame (SOF) delimiter 46 which is found in the link header 40, and an end-of-frame (EOF) delimiter 48, which is found in the link trailer 44. Frame delimiters 46 and 48 are composed of combinations of special transmission characters which do not have equivalent data codes. In the preferred embodiment, the transmission codes used are those disclosed in U.S. Pat. No. 4,486,739 issued Dec. 4, 1984 to Franaszek et al. for Byte Oriented DC Balanced (0.4) 8B/10B Partitioned Block Transmission Code, owned by the assignee of the present invention. The information contained between the frame delimiters 46 and 48 consist of data characters which have equivalent eight-bit codes as explained in the aforementioned Franaszek et al. patent.

In addition to the SOF 46, the link header 40 of FIG. 3 includes a destination-address field 50, a source-address field 52, and a link-control field 54.

As previously mentioned, the SOF 46 is a special string of transmission characters that cannot appear in the contents of an error-free frame. There are two types of SOF delimiters, the connect-SOF (CSOF) delimiter, which is used as an initiate connection control to initiate the making of a dynamic connection, and passive-SOF (PSOF) delimiter, which causes no action with respect to making a dynamic connection.

The destination-address field 50 is the first field of the contents of a frame and immediately follows the SOF delimiter 46. The destination-address field 50 identifies the link-level facility of a channel or control unit that is the destination for the frame, and is used to route the frame to the link-level facility that is the intended receiver. The destination link address 50 is used to determine which physical connection is to be made, and the destination to which the frame is to be routed through the dynamic switch 10. If no connection exists, that is, if the port P is in the inactive state, and no busy or port-reject conditions are present, the connection is made and the frame is routed to the destination port.

The source-address field 52 immediately follows the destination address field 50, and identifies the sending link-level facility.

A link-level facility provides its identity as the source of a frame by inserting its assigned link address in the source-address field 52 of any frame that it sends. After a frame is received with a valid source address 52, the source address 52 is used in most cases as the destination address in any subsequent response frame or future request frame to the same link-level facility.

The link-control field 54 indicates the type and format of the frame. In the preferred embodiment of the present invention, the contents of the link-control field 54 indicates if the present frame is an establish logical path (ELP) frame, a logical path established (LPE) frame, a remove logical path (RLP) frame, a logical path removed (LPR) frame or other request frame. The link-control field 54, which is the last field of the link header 40, immediately follows the source-address field 52.

The information field 42 is the first field following the link header 40. The size of the information field depends on the function performed by the particular frame. A reason code, for instance, is transmitted in the information field 42 of response frames.

The link trailer 44 of FIG. 4 includes a cyclic-redundancy-check (CRC) field 56 just before the EOF delimiter 48. The CRC field 56 contains a redundancy-check code that is used by the receiving link-level facility to detect most frame errors which affect the bit integrity of a frame. The address 50 and 52, link-control 54 and information 42 fields are used to generate the CRC 56 and are, therefore, protected by the CRC 56.

The end-of-frame (EOF) delimiter 48 is the last string of transmission characters of a frame. Again, it is a specific sequence of transmission characters that cannot appear in the contents of an error-free frame. When the EOF delimiter 48 is encountered during the reception of a frame, it signals the end of the frame and identifies the two transmission characters immediately preceding the EOF delimiter 48 as the CRC 56 at the end of the contents of the frame. The EOF delimiter 48 also indicates the extent of the frame for purposes of any applicable frame-length checks.

There are two types of EOF delimiters 48, the disconnect-EOF (DEOF) delimiter, which is used to initiate the removal of a dynamic connection, and the passive-EOF (PEOF) delimiter, which causes no action with respect to removing a dynamic connection.

Idle characters are sent over the links when frames are not being transmitted. These idle characters, which are special characters not having data values, are used to maintaining the links in synchronism. Sequences of special idle characters are also transmitted to provide limited communication of special control functions such as indications of off-line and malfunction conditions. These sequences of special idle characters may be generated as described in U.S. Pat. No. 5,048,062 issued Sep. 10, 1991 for "Transmitting Commands Over a Serial Link", owned by the assignee of the present invention.

The link-level facilities of the control units 26-29 and the channels 22 and 24 each include apparatus for receiving frames and for generating frames. The apparatus for receiving frames may be as described in U.S. Pat. No. 5,025,458 issued Jun. 18, 1991 for "Apparatus for Decoding Frames From a Data Link", and the apparatus for generating frames may be as described in U.S. Pat. No. 5,198,862 issued Feb. 9, 1993 for "Apparatus for Constructing Data Frames for Transmission Over a Data Link", both owned by the assignee of the present invention.

Figure 5:
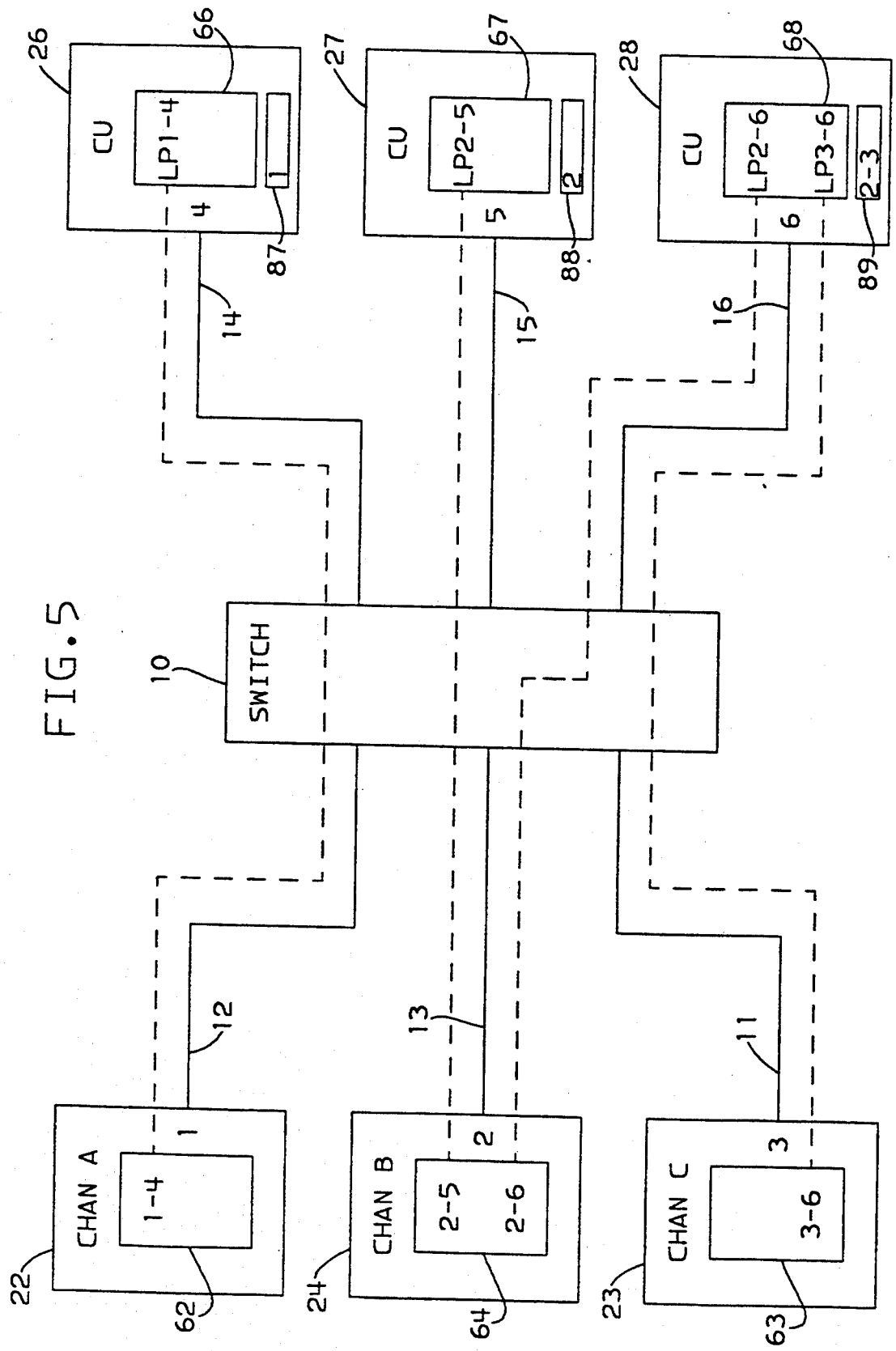
FIG. 5 is a block diagram of a portion of an I/O system illustrating established logical paths between certain ones of the channels and the control units via a dynamic switch.

FIG. 5 is a diagram of the portion of an I/O system of a computer system similar to that shown in FIG. 1. The system of FIG. 5 has three channels, channel A 22, channel B 24 (also shown in FIG. 1), and channel C 23 which are connected to a dynamic switch 10. Also connected to the dynamic switch 10 are control units 26 through 28 (also shown in FIG. 1). Channels 22, 23 and 24 include internal indicator tables 62, 63 and 64, respectively, which indicate established logical paths to individual control units, as will be discussed. Control units 26, 27 and 28 also include internal indicator tables 66, 67 and 68, respectively, which indicate the logical paths that channels 22, 23 and 24 have established. The setting of the indicators in channel tables 62, 63 and 64 and the control unit table 66, 67 and 69 is known as establishing a logical path. Shown in phantom are channel paths between channel 22 and control unit 26, channel 24 and control unit 27, channel 24 and control unit 28, and channel 23 and control unit 28. The physical path from the switch 10 to control unit 28 is then shared by channels 23 and 24. In this example the physical paths from switch 10 to control units 26 and 27 are not shared, but it will be understood that the scope of this invention permits the control units shown to have logical paths established to some or all of the channels shown. As mentioned, each channel and control unit is assigned a unique link address. The established logical paths shown include these unique addresses in the appropriate internal indicator tables. For instance, channel 22 may be given a unique address of 1 and control unit 26 may be given an address of 4. The logical path 1-4 is thus shown in internal indicator tables 62 and 66. Channel 24 may be given the unique address 2 and control units 27 and 29 may be given the addresses 5 and 6, respectively.

The internal indicator table 64 show established logical paths 2-5 and 2-6. Internal indicator table 67 also shows that logical path 2-5 is established and internal indicator table 69 shows that logical path 2-6 is established. Finally, channel 23 may have the unique address 3, and control unit 29 may have the address of 6. Thus, internal indicator table 63 shows that logical path 3-6 is established, and internal indicator table 68 also shows that logical path 3-6 is established.

Figure 6:
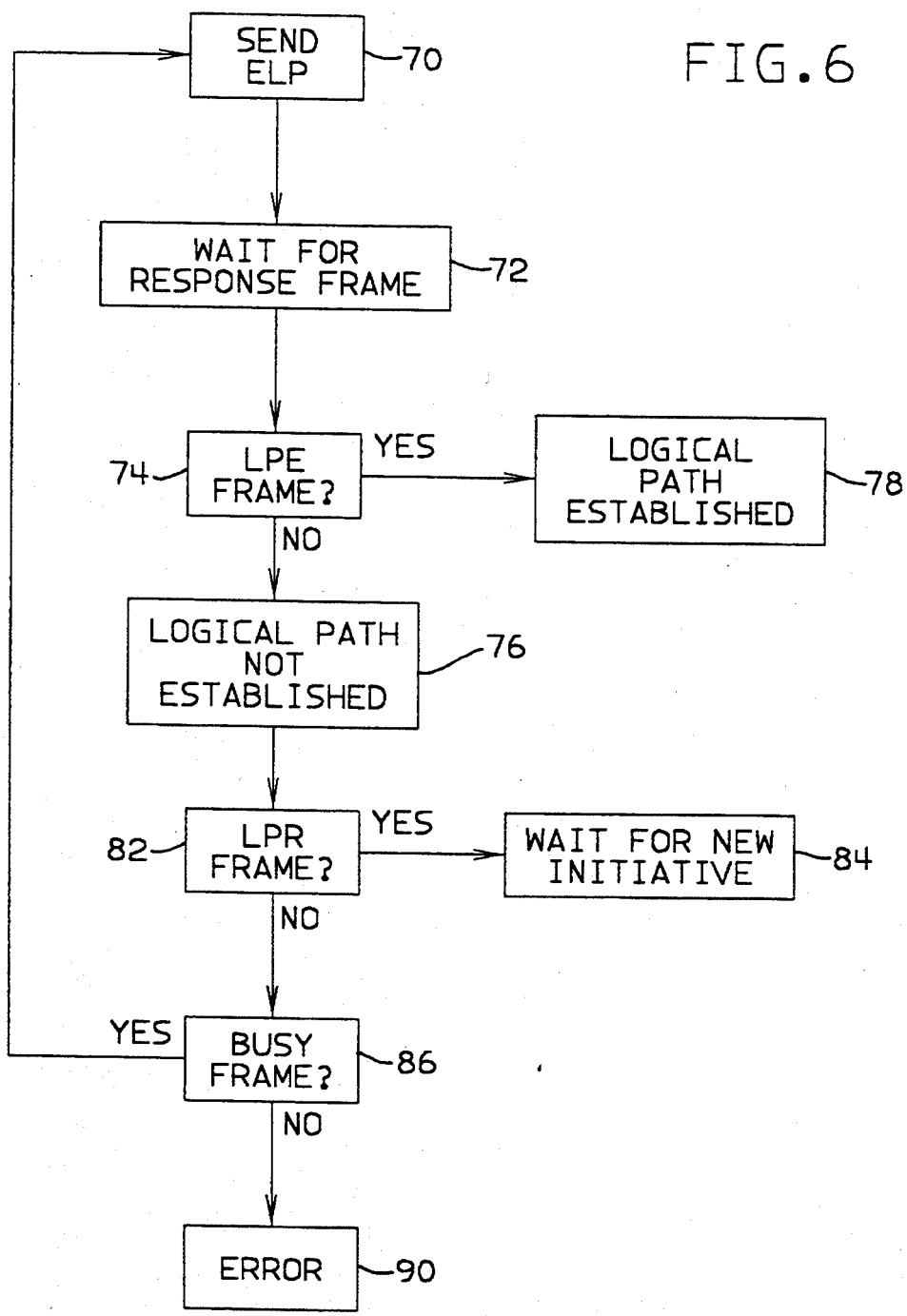
FIG. 6 is a flow chart showing the operation of a channel during an establish logical path operation.

FIG. 6 is a flow chart showing the operation of a channel during the establish logical path initialization process. At 70, the channel sends an establish logical path (ELP) frame to a control unit through the dynamic switch 10. At 72, the channel waits for a response frame. After receiving a response frame, the channel checks at 74 to see if a logical path established (LPE) frame was received. If the frame is an LPE frame, the channel updates its internal indicator table and considers that a logical path has been established with the control unit to which the ELP frame was sent. This is shown at 78.

If the response frame received at 74 is not an LPE frame, the requested logical path was not established, as shown at 76, and the channel makes a check at 82 to determine if the frame is a logical path removed (LPR) frame. As will be explained, if the addressed control unit does not accept the logical path, it returns an LPR frame. If the check at 82 is yes, the channel goes to 84 wherein immediate retry is suspended and the channel waits for a new initiative in order to proceed with the attempt to establish the logical path. If the check at 82 is no, the channel checks to see if it received either a port busy or a control unit busy frame at 86. If yes, the control unit returns to 70 and resends the ELP frame. If the check at 86 is no, the channel goes to an error routine 90.

Figure 7:
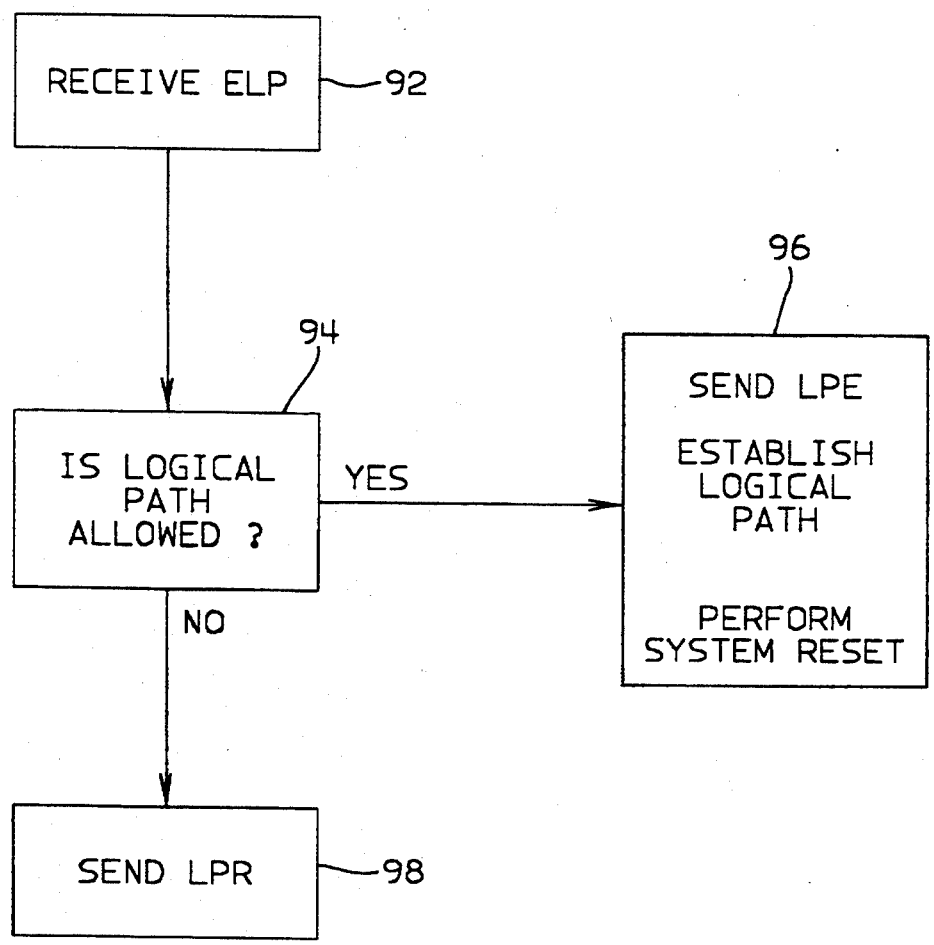
FIG. 7 is a flow chart showing the operation of a control unit during an establish logical path operation.

FIG. 7 is a flow chart showing the operation of a control unit during an establish logical path operation. At 92, the control unit receives a ELP frame from a channel. At 94, the control unit checks to see if a logical path is allowed. This may include checking to see if the maximum number of logical paths for the system have been allowed, or checking to see if the ELP frame received contains any errors. If the logical path is allowed at 94, the control unit sends a LPE frame to the channel, and establishes the logical path in its internal indicator table by setting a bit indicating that the logical path has been established. If the check at 94 is no, the control unit returns a LPR frame at 98.

The communication path between a channel and a control unit is treated as consisting of two parts, the physical path and the logical path. The physical path is the link, or interconnection of two links by a dynamic switch, that provides the physical transmission path between a channel and a control unit. This may be made as described in the aforementioned U.S. Pat. No. 5,107,489 entitled "Switch and Its Protocol for Making Dynamic Connections". The logical path represents a communication relationship that is established by a channel between itself and a control unit during initialization to identify the physical path to be used by the control unit for communication with that channel for the execution of an I/O operation and for the presentation of status. Allegiances, system resets, and path-group IDs to a particular system are identified by means of the logical path established by the channel for that system. Therefore, to a control unit, each logical path represents a different channel path to the same system or different systems. A control unit's allegiance to a channel is shown in allegiance table 87, 88 and 89 of control units 26, 27 and 28, respectively, shown in FIG. 5.

Each logical path is uniquely identified by the combination of the link address assigned to the channel and the link address assigned to the control units. As previously mentioned, all link addresses associated with a dynamic switch must be unique.

It will be understood that there is no limit other than resource limitations at the control unit on the number of logical paths that can be established over a single physical interface on a control unit, and if multiple physical interfaces exist on a control unit, each interface can have one or more logical paths.

The logical path is established as part of the initialization required for device-level function/operations. An established logical path between the channel and control unit is required for the exchange of device-level frames. When a logical path is not established, only link level communication using link-level functions and protocols is allowed. A logical-path-not-established error is detected by a link-level facility when a device-level frame is received for a logical path that is not established. When a channel receives a device-level frame and the destination link address is equal to the assigned link address, the combination of the source link address and the destination link address must identify an established logical path; otherwise, a logical-path-not-established error is detected. In a similar manner, when a control unit receives a device-level frame and the destination link address is equal to the assigned link address, the combination of the source link address and the destination link address must identify an established logical path; otherwise, a logical-path-not-established error is detected.

When a logical-path-not-established error is detected, a link-level-reject frame is sent indicating the logical-path-not-established error reject-reason code.

When the logical path is established, the physical path, the link-level facilities at each end of the physical path, and the device-level facilities associated with these link-level facilities are considered initialized and operational and have the capability of performing their respective functions. Device-level frames may not be sent to an I/O device over a channel path for which no logical path has been established. If initialization procedures at the channel have failed to establish a logical path, then subsequent I/O operations may not be attempted on that channel path to the I/O device associated with the affected control unit. However, the initiative to start an operation on a channel path does reestablish initiative at the channel to establish the logical path. If successful, the operation proceeds as normal, but if unsuccessful, the operation is not attempted on that path. Other logical paths to the I/O device may be selected by the channel subsystem.

A logical path is established, as discussed in connections with FIGS. 6 and 7, by the exchange of a request/response pair of link-control frames, the ELP and LPE frames. A logical path is removed by the exchange a request/response pair of link-control frames, removal logical path (RLP) and the logical path removed (LPR) frame. A logical path is also removed by certain error conditions which, when determined to be a permanent error, causes the removal of the affected logical path or paths.

A channel attempts to establish a logical path to each control unit that is configured to it. This is done when the channel is initialized, when configuration changes are made, or when the channel receives an indication that the logical path no longer exists.

An ELP frame that requests establishment of a logical path that the control unit already considers established does not affect the logical path other than to perform a system reset on that logical path. A control unit responds with an LPE. If additional initialization parameters are passed with an ELP frame and either protocol errors within the frame or internal conditions within the control unit prevent acceptance of the request, the control unit resets the internal indicator for the logical path and sends a LPR response to indicate the logical path was not accepted. When the channel receives the LPR response to its ELP, it does not consider the logical path to have been established and does not set its internal indicator for that logical path.

Figure 8:
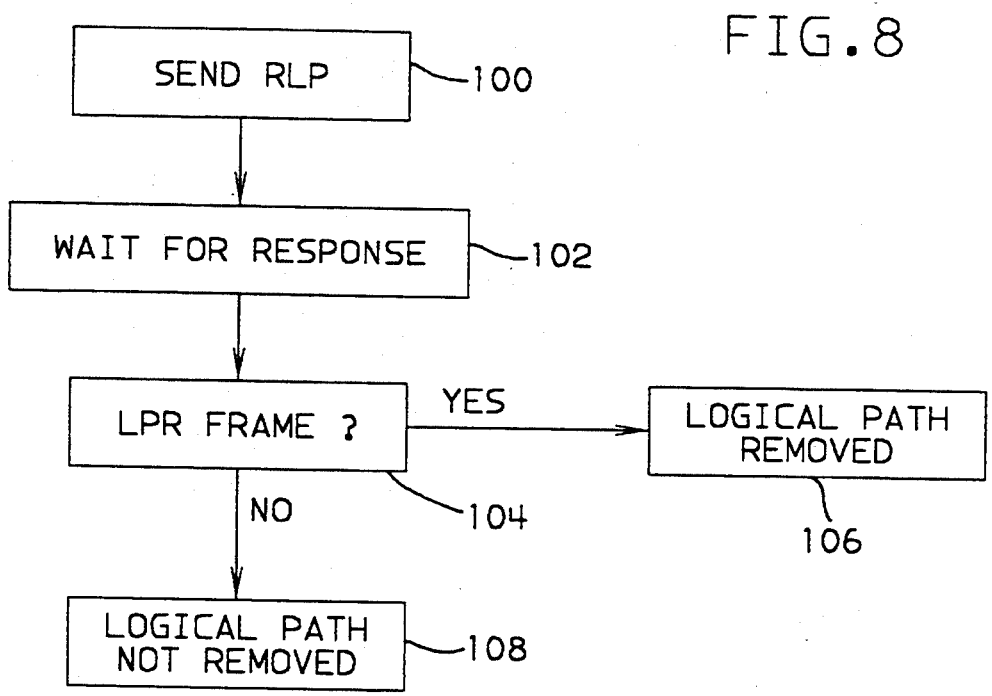
FIG. 8 is a flow chart showing the operation of a channel during a remove logical path operation.
Figure 9:
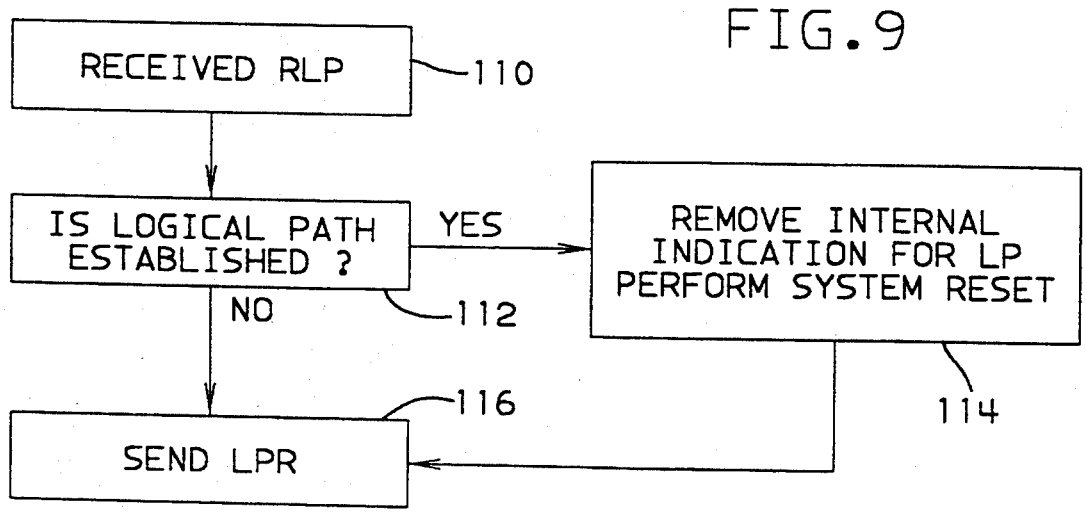
FIG. 9 is a flow chart showing the operation of a control unit during a remove logical path operation.

FIG. 8 is a flow chart showing the operation of a channel during a remove logical path operation, and FIG. 9 is a flow chart showing the operation of a control unit during a remove logical path operation. A channel can cause a logical path to be removed by sending an RLP frame at 100 of FIG. 8. The blocks 102, 104, 106 and 108 are similar to 72, 74, 78 and 76 of FIG. 6, respectively, except that a logical path is removed rather than established. The RLP frame requests the control unit to remove the logical path defined by the combination of destination and source link addresses of the frame.

A channel may remove a logical path as a result of changes to the logical path configuration or as a result of a channel path being varied logically or physically off-line. The protocols also allow for individual control units to be varied logically or physically off-line on a channel path.

The removal of a logical path causes the internal indicator for that logical path to be reset and may result in the logical path ID being discarded. The removal of a logical path causes a system reset to be performed for only the affected logical path, that is, only those allegiances and operations for that logical path are reset.

When the control unit accepts an RLP frame at 110, it removes the logical path and performs system reset at 114, and sends an LPR frame. The channel does not consider the logical path removed until it receives an LPR response to the RLP frame at 104. When the channel receives the LPR frame at 104, its internal indicator for the logical path is reset at 106. When the logical path is considered removed by a channel or control unit, device-level frames may not be sent or received for that logical path. If a frame is received for a logical path that has been removed, the frame is discarded and a reject is sent with the logical-path-not-established reject-reason code. An RLP frame must be received over the same physical path over which the logical path being removed was established. If an RLP frame is received for a logical path that is not established on the physical path over which the RLP frame is received (check at 112 is no), no action is taken other than the RLP frame is accepted and an LPR frame is sent in response at 116. No system reset is performed.

An error associated with an RLP frame prevents the logical path from being removed and causes a reject with the appropriate reject-reason code to be sent in response (not shown). The channel receiving a reject or recognizing an error in the response to the RLP frame, does not consider the logical path removed and, therefore, does not reset its internal indicator for the logical path. The channel may retry sending the RLP frame for the logical path for a set number of times.

While we have illustrated and described preferred embodiments of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by Letters Patent is:

1. In a computer I/O system having multiple channels, a dynamic switch having a plurality of switch ports, and a plurality of control units, each of said channel and control units being connected to individual ones of said switch ports, so that any physical connection between a switch port and one of the multiple channels can function as a portion of a plurality of physical paths, each one between that one channel and a different one of the plurality of control units and each physical connection between a switch port and one of the plurality of control units can function as portion of a multiplicity of physical paths each physical path in the multiplicity between that one control unit and one of the multiplicity of channels, a method for establishing logical paths for uniquely identifying permitted physical paths for device level I/O operations comprising:

sending a request from said channel for requesting the establishment of a logical path to represent a physical path to be made by said dynamic switch from said channel to a designated control unit via said dynamic switch;

forwarding said request to said designated control unit via said switch;

receiving at said designated control unit, said request;

determining if the requested logical path is allowed; and storing the identity of an established logical path when said requested logical path is allowed whereby each such logical path so established identifies, for subsequent device level I/O operations, a permitted physical path through the dynamic switch and along shared physical connections coupling the dynamic switch to one of the plurality of control units and one of the multiple channels.

2. The method of claim 1 further comprising:

returning an established logical path response to said channel via said switch after said identity of said established logical path is stored in said designated control unit; and responsive to the receipt of said established logical path response, storing an identity of said established logical path in said channel.

3. The method of claim 2 further comprising:

storing in an allegiance table in said designated control unit, the identity of the logical path over which an allegiance has been created.

4. A logical path mechanism for use in a control unit comprising:

receiving means for receiving establish logical path frames requesting the establishment of a logical path from said control unit to a designated channel, each of said establish logical path frames containing an identity of the logical path requested to be established which identity uniquely identifies a physical path, said requested logical path being required for the communication of data between said control unit and said designated channel;

control unit logical path table means for storing the identity of established logical paths to channels;

logic means for determining when said logical path establish frame is and is not allowed;

logical path removed means for sending a logical path removed frame to said designated channel when said logic means determines said logical path to said designated channel is not allowed;

logical path adding means for adding the identity of an established logical path in said control unit logical path table means when said logic means determines that a logical path to said designated channel is allowed.

5. The logical path mechanism of claim 4 further comprising frame generator means for sending a logical path established frame to said designated channel when said identity of an established logical path to said designated channel is added to said control unit logical path table means.

6. The logical path mechanism of claim 5 wherein said receiving means further receives remove logical path frames for removing a logical path from said control unit to the designated channel, and wherein said logic means further determines if a logical path is established to said designated channel; and said logical path mechanism further comprises:

logical path removal means for removing the identity of an established logical path in said control unit table means when said logic means determines that a logical path to said designated channel is established; and said frame generator means sends a logical path removed frame to said designated channel when said identity of an established logical path to said designated channel is removed from said control unit logical path table means.

7. A computer I/0 system with a plurality of control units and multiple channels comprising:

logical path requesting means for sending an establish logical path request frame requesting the establishment of a logical path representing a physical path between and one of said multiple channels and a designated control unit, said establish logical path request frame containing an identity of the logical path requested to be established, said requested logical path being required for the communication of data between said channel and said designated control unit;

frame recognizing means for recognizing response frames returned to said channel responsive to said establish logical path request frame;

channel logical path table means for storing identities of established logical paths to control units;

logical path adding means for adding the identity of an established logical path to said designated control unit in said channel logical path table means responsive to the recognition of a logical path established response frame from said designated control unit sent in response to an establish logical path request frame from said logical path requesting means;

frame generating means incorporating the identity of an established logical path in all communication frames between any one of said channels through a designated control unit to devices connected to that designated control unit; and dynamic switch means responsive to the identity of a logical path in each one of the communication frames to establish the physical path represented by said identity.

8. The computer I/O system of claim 7 further comprising:

logical path remove request means for requesting the removal of a logical path from said channel to a designated control unit; and logical path removal means for removing the identity of any established logical path to said designated control unit in said channel logical path table means, the removal of said identity being responsive to the recognition of a logical path removed response frame from said designated control unit.

9. A logical path mechanism for use in a computer I/O system having a plurality of control units coupled to multiple channels comprising:

a dynamic switch means having a plurality of switch ports, with each of said channel and control units being physically connected to individual ones of said switch ports so that a physical connection between a switch port and one of the multiple channels can function as a portion of a plurality of physical paths, each path in said plurality between that channel and a different one of the plurality of control units and a physical connection between a switch port and one of the plurality of control units can function as a portion of a multiplicity of physical paths, each path in said multiplicity between that one control unit and a different one of the multiple channels;

logical path requesting means in said channel for requesting the establishment of a logical path to represent a physical path from one of the multiple channels to a designated one of the plurality of control units via said dynamic switch, and at least two of the physical connections; said logical path requesting means including an identity of the logical path requested to be established, said establishment of a requested logical path being required for the communication of data along a physical path between said one channel and said designated control unit via said dynamic switch;

forwarding means in said dynamic switch for forwarding requests from said logical path requesting means to said designated control unit; and logical path means in each of said control units for receiving requests from said logical path requesting means, each of said logical path means including logical path table means for storing the identity of established logical paths to ones of said multiple channels and internal indicated for indicating when said logical paths are established;

logical path removed means for returning to said channel via said dynamic switch, a removed message when said requested logical path is not established; and logical path established means for setting the internal indicator in said logical path table means for indicating that said requested logical path is established and for returning to said channel via said dynamic switch, a logical path established acknowledgement when said requested logical path is established, thereby establishing a communication path between said channel and said designated control unit whereby each such logical path so established identifies, on subsequent device level I/O operations, one of the permitted physical paths to be made during the operation of the computer I/O system through the dynamic switch along physical connections coupling the dynamic switch to one of the plurality of control units and one of the multiple channels.

10. The computer I/O system of claim 9 further comprising:
channel frame generating means for generating frames for transferring information and instructions through the switch means between the multiple channels and the plurality of control units, each such frame so generated identifying to the switch means and the intended receiver of said information the logical path to be used in terms of the identity of the sender of the frame and the intended receiver of the frame; and
means in said dynamic switch means for establishing a physical path between its ports coupled to the sender and receiver in response to said channel frames.

11. The computer I/O system of claim 10 wherein said requests for establishment of a logical path is a frame generated by said channel path generating means.

12. The logical path mechanism of claim 9 wherein said logical path requesting means comprises a channel frame generating means for transmitting an establish logical path (ELP) frame.

13. The logical path mechanism of claim 12 wherein each control unit includes a control-unit frame generating means for generating a logical path removed (LPR) frame in response to said logical path removed means and a logical path established (LPE) frame in response to said logical path established means.

14. The logical path mechanism of claim 13 wherein said logical path requesting means in said channel includes:
channel logical path table means for storing the identity of logical paths and channel internal indicator for indicating said logical paths are established;
frame recognition means;
channel logical path established means for setting the channel internal indicator of a requested logical path in said channel logical path table means for indicating said requested logical path is established in response to the recognition of an LPE frame by said frame recognition means.

15. The logical path mechanism of claim 14 wherein each control unit includes:
allegiance storing means for storing the identity of channels from which logical paths have been established; and
reset means for performing a system reset when a logical path is established or removed to a channel whose identity is stored in said allegiance storing means.

16. A computer I/O system having a plurality of control units coupled to multiple channels comprising:
a dynamic switch means having a plurality of switch ports, with each of said multiple channels and plurality of control units being physically connected to individual ones of said switch ports so that a physical connection between a switch port and one of the multiple channels functions as a portion of a plurality of physical paths each one between that channel and one of the plurality of control units and a physical connection between a port and one of the plurality of control units functions as a portion of a plurality of physical paths each one between that one control unit and one of the plurality of channels:
logical path requesting means for sending an establish logical path request frame requesting the establishment of a logical path, which logical path identifies a physical path through said dynamic switch means and certain of said physical connections from one of the multiple channels to a designated one of the plurality of control units, said establish logical path request frame containing an identity for the logical path requested to be established, said establishment of the requested logical path being required for device level communication of data between said any one channel and said designated control unit;
frame recognizing means for recognizing response frames, including a logical path established response frame, returned to said one of the multiple channels from said designated one of the plurality of control units in response to said establish logical path request frame;
channel logical path table means for storing the identity of established logical paths to control units; and
logical path adding means for adding in said channel logical path table means the identity of an established logical path in response to the recognition of such a logical path established response frame by said frame recognizing means whereby such logical path so established identifies, in subsequent device level I/O operations, a permitted physical path to be made through the dynamic switch and along shared physical connections coupling the dynamic switch to said one of the plurality of control units and said one of the multiple channels.

17. The computer I/O system of claim 16 further comprising:
channel frame generating means for generating said established logical path request frame and other frames for transferring information and instructions through the switch means between the multiple channels and the plurality of control units, each such frame so generated identifying to the switch means and the intended receiver of said information the logical path to be used in terms of the identity of the sender of the frame and the intended receiver of the frame; and
means in said dynamic switch means for establishing a physical path between its ports coupling the sender and receiver in response to said channel frames.

18. The computer I/O system of claim 16 further comprising:
receiving means in said control units for receiving said establish logical path frames requesting the establishment of a logical path, and receiving means including:
control unit logical path table means for storing the identity of established logical paths;
logic means for determining when said logical path establish frame is and is not allowed;
logical path removed means for sending a logical path removed frame to a particular one of the multiple channels when said logic means determines said logical path to said particular channel is not allowed;
logical path adding means for adding the identity of an established logical path in said control unit logical path table means when said logic means determines that a logical path to said particular channel is allowed.

19. The logical path mechanism of claim 18 further comprising means for sending a logical path established frame to said particular channel when said identity of an established logical path to said particular channel is added to said control unit logical path table means.

20. The computer I/O system of claim 18 further comprising:
channel frame generating means for generating frames for transferring information and instructions through the switch means between the multiple channels and the plurality of control units, each such frame so generated identifying to the switch means and the intended receiver of said information the logical path to be used in terms of the identity of the sender of the frame and the intended receiver of the frame; and
means in said dynamic switch means for establishing a physical path between its ports coupled to the sender and receiver in response to said channel frames.

* * * * *

UNITED STATES PATENT AND TRADEMARK OFFICE
CERTIFICATE OF CORRECTION

PATENT NO. : 5,420,988           Page 1 of 2
DATED : May 30, 1995
INVENTOR(S) : Joseph C. Elliott It is certified that error appears in the above-indentified patent and that said Letters Patent is hereby corrected as shown below:

Col. 11,
Claim 7, line 42      delete "and" and substitute therefor --any--.

Col. 13,
Claim 12, line 23      delete "logical path mechanism" and substitute therefor --computer I/O system--.

Col. 13,
Claim 13, line 27      delete "logical path mechanism" and substitute therefor --computer I/O system--.

Col. 13,
Claim 14, line 33      delete "logical path mechanism" and substitute therefor --computer I/O system--.

Col. 13,
Claim 15, line 46      delete "logical path mechanism" and substitute therefor --computer I/O system--.

UNITED STATES PATENT AND TRADEMARK OFFICE
CERTIFICATE OF CORRECTION

PATENT NO. : 5,420,988
DATED : May 30, 1995
INVENTOR(S) : Joseph C. Elliott

It is certified that error appears in the above-indentified patent and that said Letters Patent is hereby corrected as shown below:

Col. 6, line 31      delete "Pat. No. 5,198,862" and substitute therefor --Pat. No. 5,185,862--.

Signed and Sealed this

Ninth Day of July, 1996

Attest:

BRUCE LEHMAN

Attesting Officer      Commissioner of Patents and Trademarks